United States Patent [19]
Bajat et al.

[11] Patent Number: 5,258,874
[45] Date of Patent: Nov. 2, 1993

[54] FRICTION-FREE BISTABLE DEVICE FOR USE IN SPACE APPLICATION, IN PARTICULAR FOR CLOSING AN APERTURE OF A SPACE APPLICATION OPTICAL INSTRUMENT

[75] Inventors: Thierry Bajat, Mandelieu; Jean-Jacques Digoin, Les Adrets; Jean Nesa, Mandelieu, all of France

[73] Assignee: Aerospatiale Societe Nationale Industrielle, Paris, France

[21] Appl. No.: 748,631

[22] Filed: Aug. 22, 1991

[30] Foreign Application Priority Data
Aug. 22, 1990 [FR] France .................. 90 10551

[51] Int. Cl.⁵ .............................................. G03B 9/08
[52] U.S. Cl. ............................... 359/894; 359/227; 354/271.1
[58] Field of Search .......... 359/894, 227, 230, 824, 359/224, 225, 273; 354/271.1, 234.1, 235.1

[56] References Cited
U.S. PATENT DOCUMENTS

| | | | |
|---|---|---|---|
| 3,635,141 | 1/1972 | Starp et al. | 354/235.1 |
| 3,826,557 | 7/1974 | Lobb et al. | 359/434 |
| 4,088,405 | 5/1978 | Pustka et al. | 354/234.1 |
| 4,171,897 | 10/1979 | Fujita et al. | 354/234.1 |
| 4,514,064 | 4/1985 | Kurosu et al. | 354/234.1 |

FOREIGN PATENT DOCUMENTS

| | | |
|---|---|---|
| WO8502478 | 11/1984 | European Pat. Off. . |
| WO8909944 | 3/1989 | European Pat. Off. . |
| 2532563 | 2/1977 | Fed. Rep. of Germany ...... 254/234 |
| 3901220 | 7/1989 | Fed. Rep. of Germany . |
| 275332 | 1/1990 | German Democratic Rep. . |

Primary Examiner—Carolyn E. Fields
Assistant Examiner—Drew A. Dunn
Attorney, Agent, or Firm—Remy J. VanOphem

[57] ABSTRACT

Device for the assembly and movement control of a mobile element that moves with respect to a support between two extreme positions, characterized in that it includes an arm pivotable around a rotation axis which supports the mobile element; an elastic torsion rod aligned along the axis, secured respectively to the arm and to the support at axially offset points; two mechanical stops mounted on the support which determine two extreme angular configurations of the arm in which the element is in its extreme positions, the elastic torsion rod tending to bring the arm into a predetermined one of these configurations; two pairs of complementary magnetic latching elements mounted, respectively, on the support and on the arm, the complementary units of either pair being adapted to be opposite when the arm is in one or the other of the extreme configurations; and launching members mounted on the support designed to give a launching impetus to the arm from each to the other of the extreme configurations.

9 Claims, 3 Drawing Sheets

FRICTION-FREE BISTABLE DEVICE FOR USE IN SPACE APPLICATION, IN PARTICULAR FOR CLOSING AN APERTURE OF A SPACE APPLICATION OPTICAL INSTRUMENT

BACKGROUND OF THE INVENTION

1. Field of the Invention

The invention relates to the assembly and movement control of an element that can move angularly with respect to a support between two extreme positions.

It concerns in particular, but not exclusively, the assembly and movement control of a shutter adapted to close, or open, an aperture of an optical space instrument, for example, a terrestrial or stellar observation telescope.

2. Description of the Prior Art

As is known, there are certain phases in the life of an optical space system during which its aperture must be closed. This not only applies to the launch of the space vehicle in which this optical space system is mounted until the space vehicle is in its service configuration, but also later in the normal service life of this optical system, in particular when, because of the attitude of the space vehicle, the optical system is subjected to subsequent risk of attack from such things as sun glare, collision with foreign particles, and the like.

The closing and opening of the aperture of such an optical system involves the operation of a shutter panel or flap between an open configuration in which the aperture of the system is open and a closed configuration in which no beam, of light or particles, can enter the optical system.

It should be noted that the function (temporary protection) of the shutter flap considered here differs from that of the shutter of a camera which must be operated at high speed so that it remains open for only a very short exposure time.

It should be also be noted that the fact the shutter flap must be operated in the vicinity of an optical system excludes the use of lubricants, not only because of the surrounding space vacuum, but also because of risks of these lubricants polluting any cold surfaces of the optical system such as, for example, is the case with infrared observations which involve cooling of the optical system itself.

Taking into account that the purpose of the assembly and movement control device, also referred to as "mechanism" hereinafter, is to be on board a space vehicle, no human intervention is possible in the event of failure. Now it may appear necessary, at any time during the life of the space vehicle, to move the shutter from one of its positions to the other, failing which the continuation of the mission may be irretrievably compromised, with economic results that can be imagined. Increasing levels of reliability are, therefore, sought for such a device, particularly since the life expectancy of space vehicles, particularly satellites, is tending to increase; durations of the order of ten years are often sought.

Attempts have already been made to attain high reliability, but in practice by proposing to use electric motors, with ball bearings. This can lead to bonding of parts in contact because of the space vacuum, leading to risk of damage.

SUMMARY OF THE INVENTION

The object of the invention is to eliminate the risk of damage, so as to attain a level of reliability heretofore unknown, by proposing for such an assembly and movement control device a simple structure, guaranteeing that the reliability is maintained over time, without relative friction parts, eliminating the risk of mechanical failure, in particular through vacuum bonding, without consuming energy for maintaining the equipment in its extreme positions to achieve a bi-stability which limits energy requirements exclusively to movements between these two positions, at the same time according priority to one of its positions to reduce the consequences of any problem during operation, and observing the conventional space application requirement of being lightweight.

For this purpose, the invention proposes a device for the assembly and movement control of an element that can move with respect to a support between two extreme positions. The device includes an arm supporting the mobile element, which arm pivots around a rotation axis. An elastic torsion rod is aligned along the rotation axis, secured respectively to the arm and to the support at axially offset points. Two mechanical stops are mounted on the support and determine for the arm two extreme angular configurations in which the element is in its extreme positions, the elastic torsion rod tending to bring the arm into a predetermined one of these configurations. Two pairs of complementary magnetic latching elements are mounted, respectively, on the support and on the arm, the complementary units of either pair being adapted to be opposite when the arm is in one or the other of the extreme configurations. The device further includes launching means mounted on the support designed to give a launching impetus to the arm from each to the other of the extreme configurations.

Preferred arrangements, according to the invention, some of which may possibly be combined, are as follows.

The two pairs of complementary magnetic latching elements constitute two fixed parts disposed either side of the volume swept by the arm around the rotation axis and at least one part supported by the arm so as to be opposite either of the fixed parts and adapted to be held there by magnetic attraction, a winding being provided around each fixed part with a winding axis perpendicular to the arm when the latter is in the vicinity of the fixed part.

The fixed parts are made of magnetic material, forming jointly with their winding an electromagnet, and the mobile part is a magnet magnetized in a direction transverse to the arm and perpendicular to the torsion rod.

The fixed parts are magnets magnetized in a direction transverse to the arm when the latter is nearby, and the mobile part is made of magnetic material.

The launching means are included in the complementary latching elements.

The launching means constitute windings wound around latching elements mounted on the support, each winding having a winding axis perpendicular to the arm when the latter is nearby, or the launching means may be composed of a lever mounted on a flexible torsion pivot parallel to the torsion rod having a thrust pin designed to apply a launching impetus to the arm and a section engaged in a coil mounted on the support, the rod having a median portion to which the arm is secured and end portions integral with the support.

The mobile element is a shutter designed to respectively close or open an aperture in the support, and the elastic torsion rod is perpendicular to the plane of the aperture.

Objects, characteristics and advantages of the invention will emerge from the following description given by way of non-limiting example only with reference to the appended drawings.

DETAILED DESCRIPTION OF THE PREFERRED EMBODIMENT

Figure 1:
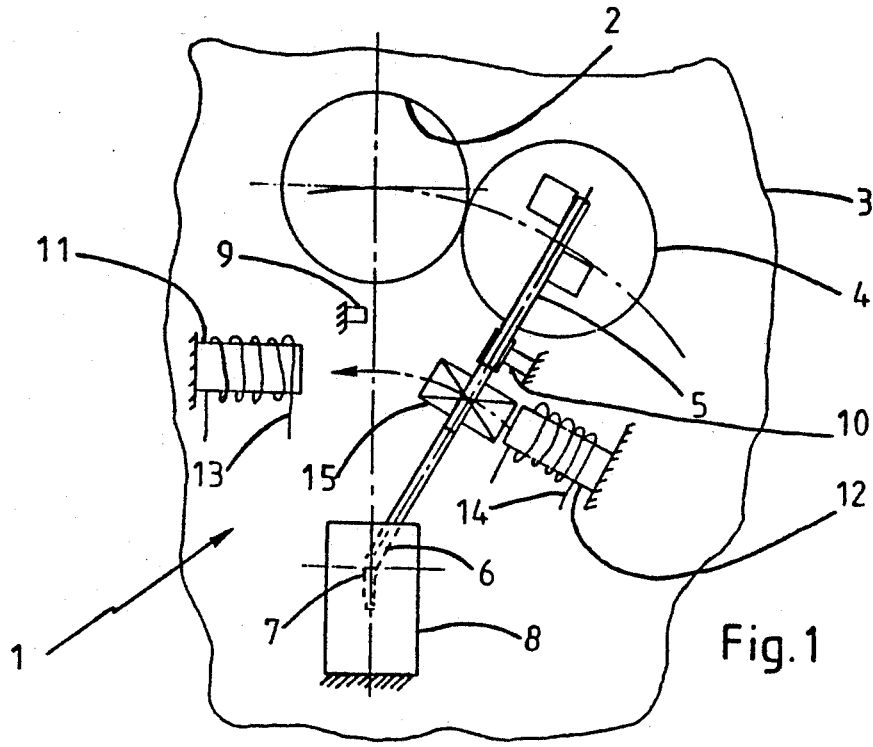
FIG. 1 is a schematic diagram of a device in accordance with the invention designed to close an aperture according to a first embodiment thereof.
Figure 2:
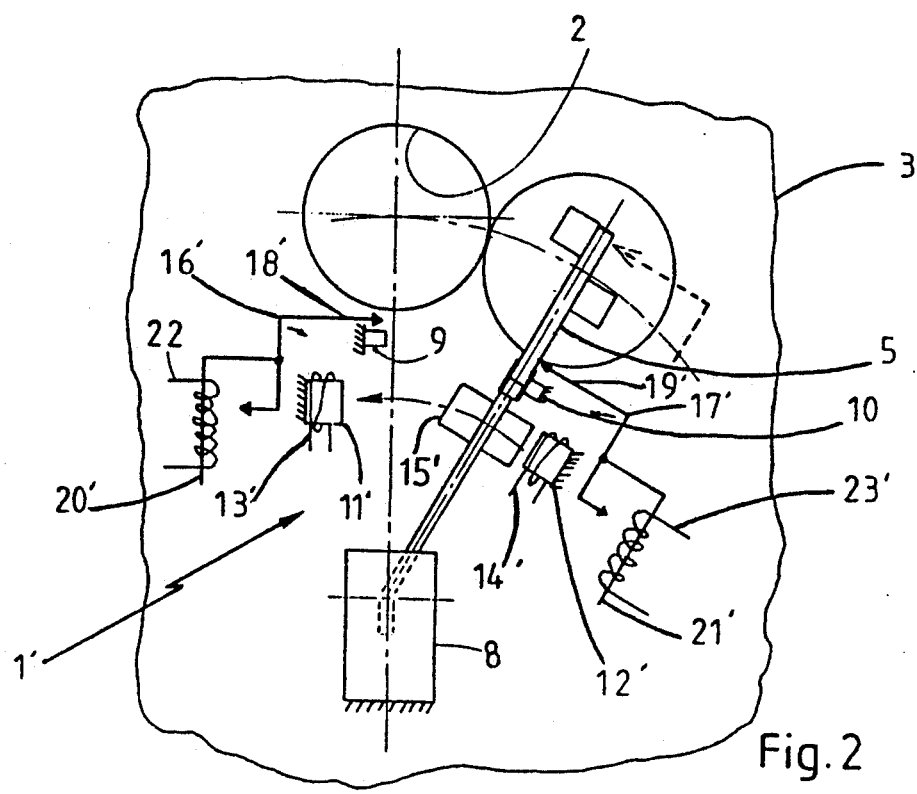
FIG. 2 is a diagram similar to FIG. 1 according to a second embodiment of the invention.

FIGS. 1 and 2 schematically depict two assembly and movement control devices 1 and 1', designed to close or open an aperture 2 in a fixed plate 3, by means of a shutter element, illustrated in the form of a disc 4, that can move parallel to the fixed plate 3 between a closed configuration (not shown) and an open configuration.

Figure 5:
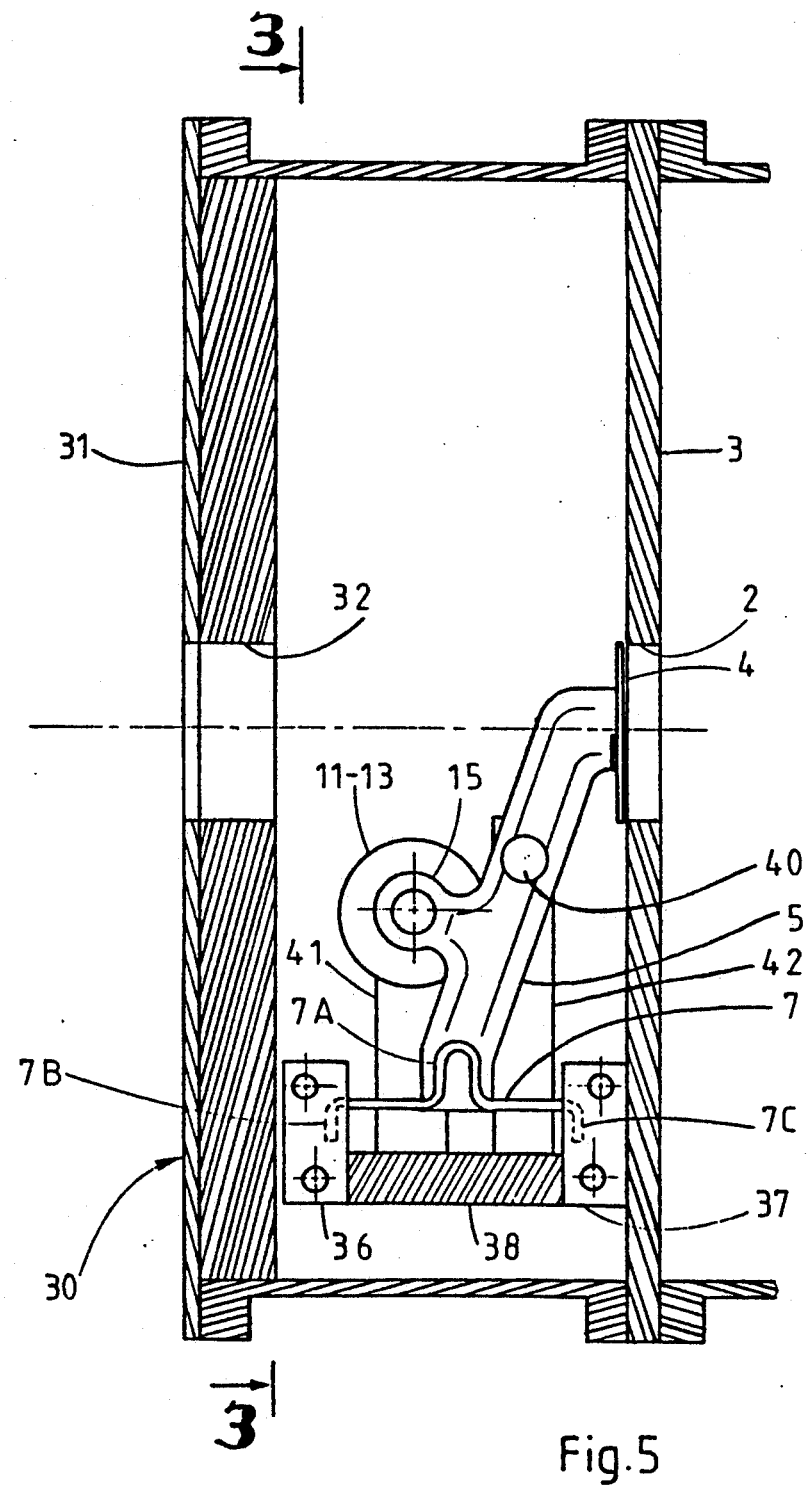
FIG. 5 is a side view of the device taken along line 5—5 in FIG. 3.

The disc 4 integral with an arm 5, an area 6, here an end, of which is linked to an elastic torsion rod 7 perpendicular to the plate 3, forming a pivot axis. Away from the area in which it is attached to the arm, the torsion rod is anchored in a support portion. Preferably, as shown in FIG. 5, the torsion rod is attached at its median area 7A to the arm while its ends 7B and 7C are anchored respectively in the plate 3 and in a support plate 8 integral with it (and here parallel to it).

Two mechanical stops 9 and 10, also integral with the plate, are provided to delimit the pivoting movement of the arm. When the arm is in contact with the stop 9, the disc is in the closed configuration, and when the arm is in contact with the stop 10, the disc is in the open configuration.

The torsion rod 7 is pre-tensioned so as to tend to bring the arm against a predetermined one of the stops, referred to as the priority stop. The priority stop is selected according to the configuration that the disc is required to adopt spontaneously. For example, if the open configuration has priority, the stop 10 is selected as the priority stop.

The plate 3 also supports, disposed either side of the volume swept by the pivoting movement of the arm, two fixed parts 11 and 12 opposite either of which a mobile part 15, supported by the arm (and where applicable deployed either side of the arm), can be positioned and held there by magnetic attraction, even in the configuration in which the torsion rod 7 is tending to move the arm. Around the fixed parts are mounted windings 13 and 14, respectively, perpendicular to the arm when the arm is in the vicinity of the fixed part in question.

The arm can thus remain at rest in a stable manner in each of its configurations.

The windings 13 and 14 are intended, when they are electrically powered, to cancel, or even reverse, the magnetic interaction between the fixed parts 11 and 12 and the mobile part 15 mounted on the arm, so as to release the arm or even push it back, towards its other configuration.

In FIG. 1, the fixed parts 11 and 12, with their windings 13 and 14, constitute electromagnets, while the mobile part 15, integral with the arm, is a magnet magnetized in a transverse direction to the arm. For clarity of the drawing, the yokes, conventional in themselves, which are used to enclose the field lines, are not shown.

In each stable configuration of the arm, the arm is resting against the mechanical stops 9 or 10, "latched" there by the attraction of the magnet opposite the fixed part 11 or 12 forming a soft iron core for the winding surrounding it. The magnet is dimensioned so that the attraction force towards the soft iron core is greater than the restoring force of the torsion rod 7, taking into account in addition a safety margin defined according to the maximum amplitude of the unwanted stresses which the "magnetic latch" is required to be able to resist, in particular originating in the launch vibrations of the satellite or spacecraft of which the plate 3 forms a part.

To move the disc from one of its configurations to the other, a current I is injected into the winding 13 or 14 in the vicinity of which the arm is located so as to create a magnetic field in a direction opposite to that of the magnet 15 (creating opposite poles of the same sign), and of amplitude greater than that of the magnetic field of the magnet. This leads to the creation of a repelling force on the magnet and, therefore, on the arm. The electromagnet is dimensioned so as to create a thrust (acceleration) sufficient to overcome the attraction of the magnet, plus or minus the restoring force of the torsion rod 7, and in addition to inject into the arm and the disc sufficient kinetic energy to bring it sufficiently close to the other configuration for it to be magnetically attracted to the other soft iron core.

At the same time, or where applicable after, a current I' is advantageously injected in the other coil in order to temporarily increase the magnetic attraction, so as to avoid the arm rebounding from the stop towards which it is being impelled.

In fact, the minimum thrust that must be applied to the arm differs according to the direction of movement, taking into account the elastic energy stored in the torsion rod. However, for reasons of wiring simplicity, identical currents I are applied in both directions, at a value that is therefore selected to be able to overcome the effect of the torsion rod 7.

It will be appreciated that if the thrust is insufficient following a temporary problem, the arm will return to its priority configuration; it, therefore, never stops halfway between its configurations. The operation can then be repeated when the temporary problem has been overcome.

FIG. 2 depicts an alternate embodiment in which the fixed parts 11' and 12' are magnets magnetized in a direction perpendicular to the position of the arm, in the configuration in question, while the mobile part 15' is a magnetic part. The operating principle, by feeding power to the windings 13' and 14', is similar to that of FIG. 1.

The assembly and movement control device 1' in FIG. 2 also differs from that in FIG. 1 by the fact that it also includes additional elements to give the arm necessary impetus for the change of configuration.

Additional elements are adapted to apply a mechanical thrust to the arm.

These additional elements include, in the vicinity of each of the extreme configurations of the arm, an elbowed lever 16' or 17' mounted on a flexible torsion pivot parallel to the torsion rod 7, which can be of the same nature as the latter, and having a thrust pin 18' or 19' adapted to launch the arm, without accompanying it, towards its other configuration. The elbowed lever also includes an area 20' or 21', the movement of which is controlled by electromagnetic effect. The areas 20' and 21' are preferably soft iron sections surrounded by coils 22' or 23'.

The energy necessary to move from one stable configuration to the other is provided by the thrust pin, the windings 13' and 14' powered in synchronism, serving to temporarily neutralize the magnetic fields of the magnets 11' and 12' to release the arm, or on the contrary to increase these fields to assure a correct end of travel of the arm.

Either of the working methods will be chosen according to certain criteria, such as inertia of the moving mass; amplitude of the angular movement; available weight and volume; and latching requirement, in the open or closed stable position. This is important because the levels of vibration that the mechanism can accept will depend on the latching requirement. Among other things, the levels of vibration depend on the type of launcher, the on-board mass, the location of the mechanism, etc.

If the energy required for the movement and, therefore, the force, is too great, a linear thrust system such as depicted in FIG. 2 is more suitable than an electromagnetic thrust as depicted in FIG. 1. Such a linear "hammer" requires fewer ampere-turns but is slightly more complex in mechanical terms.

The principle explained with reference to FIGS. 1 and 2 is a rotation of limited amplitude of the order of 25°–35° of the arm around an axis perpendicular to the plane of the aperture.

The principle can be extended, as will easily be understood by those skilled in the art, to the case in which the rotation axis is parallel to this plane, since the amplitude of rotation should in principle be greater.

In fact, the principle of the invention is applied without difficulty to amplitudes of up to 80°–90°.

The orientation of the rotation axis will be chosen according to implementation constraints.

Figure 3:
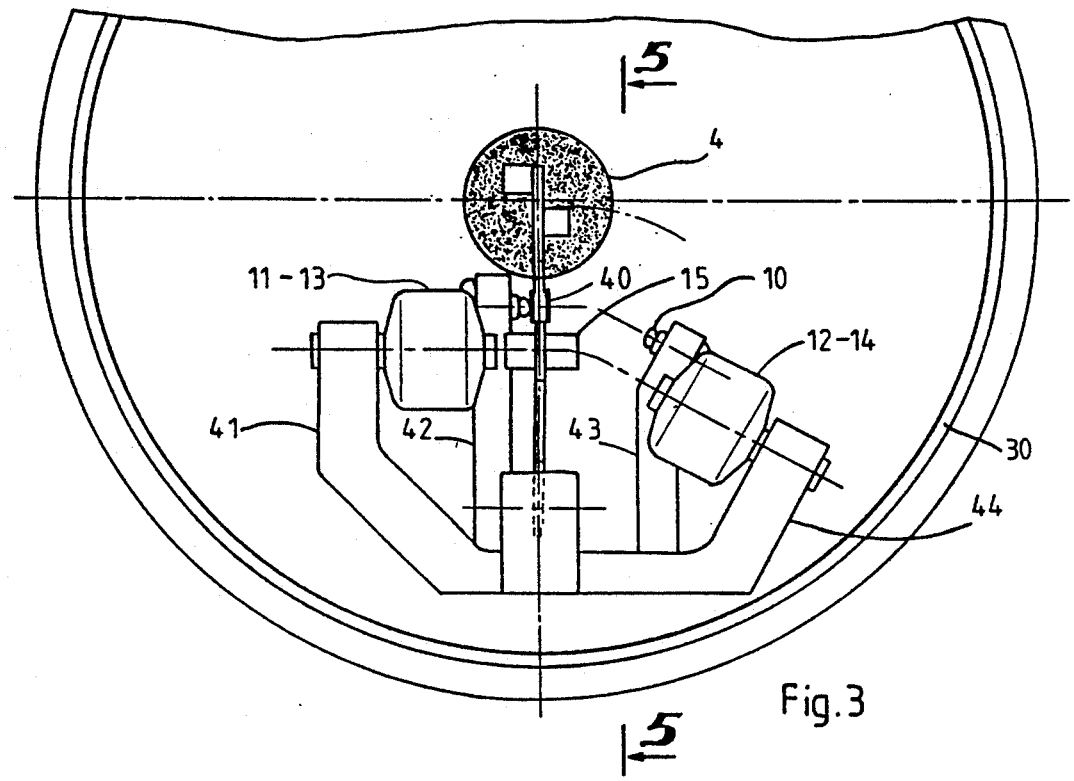
FIG. 3 is a plan view, along line 3—3 of FIG. 5, of a device in accordance with the invention conforming to the diagram in FIG. 1, in the aperture's closed configuration.
Figure 4:
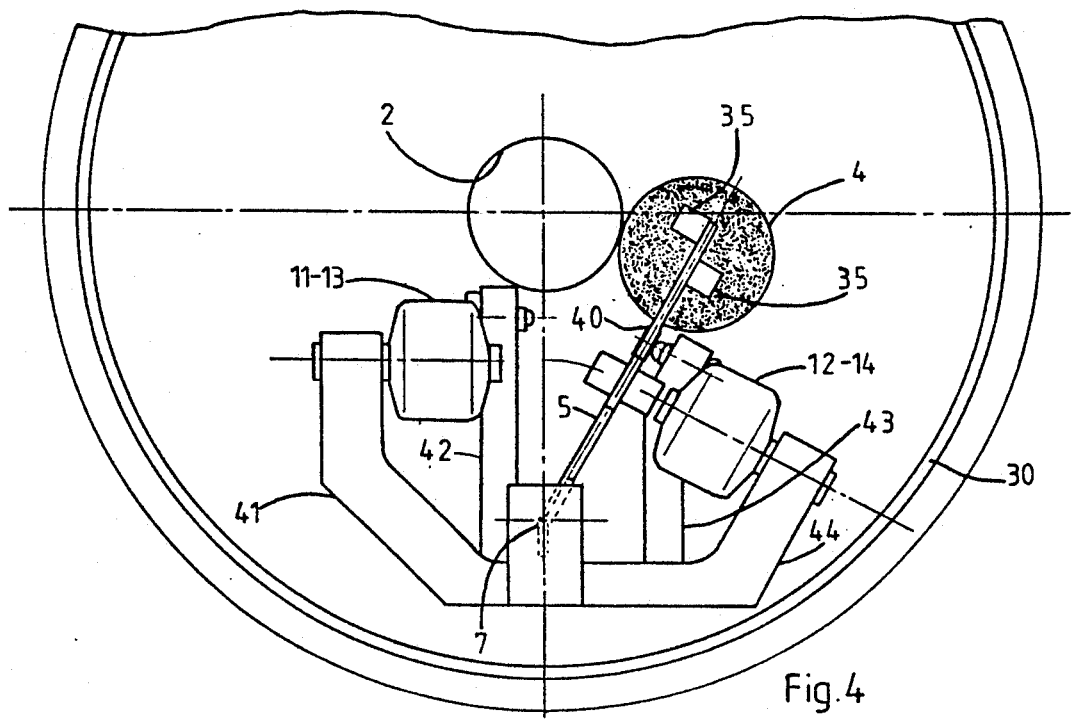
FIG. 4 is a plan view of the device depicting the aperture's open configuration.

FIGS. 3, 4 and 5 each show an embodiment of the device of FIG. 1.

This device is placed in a cylindrical enclosure 30 closed by the plate 3 and a plate 31, containing coaxial apertures 2 and 32, respectively.

The disc 4, with a diameter slightly greater than that of the optical beam determined by the aperture 2, is placed as close as possible to the plate 3 so as to avoid diffraction phenomena.

The arm 5 has a geometry designed to render it rigid and lugs 35 for attaching it to the rear of the disc.

The torsion rod 7 consists of a "pin", the central portion 7A of which is linked to the arm 5, while its elbowed ends 7B and 7C are pressed between pairs of clamping blocks 36 and 37 linked by a spacer 38, one of these parts being the support part 8 shown in FIG. 1. The angular movement of the arm is 29°.

The mechanical stops 9 and 10 have spherical bearing surfaces and come into contact with pads 40 mounted on the arm, treated in an appropriate known manner to avoid vacuum bonding.

The stops and electromagnets 11 and 13 and 12 and 14, respectively, are held in position by elbowed beams 41 to 44 integral with the spacer 38, making the entire device easy to handle.

Preferably, the stops can be adjusted with respect to the beams by using a known micrometric assembly, enabling the extreme positions of the arm and the disc and the clearances between the parts 11 or 12, and 15 to be accurately adjusted.

Advantageously, the "pin" of the torsion rod is pretensioned with a stress that remains positive even in the priority configuration, contributing to the "latching" of the arm in this configuration.

The windings 13 and 14 are advantageously duplicated for redundancy reasons.

It will be appreciated that a dynamically balanced state of the arm and the disc, forming a "mobile system", with respect to the torsion rod 7 enables the latching effect to be optimized in the presence of substantial vibrational constraints. The use of electromagnetic devices offers full facilitates for calibrating the energy transmitted to the mobile system (current values, ampere-turns of the coils, etc.).

All the electromagnetic elements are structurally redundant ("cold redundancy"), guaranteeing maximum electrical reliability, while the mechanical structure guarantees high reliability with no need for redundancy.

It will be understood that the foregoing description is given by way of non-limiting example only and that many variants can be proposed by those skilled in the art without departing from the scope of the invention.

What is claimed is:

1. A device for controlling the movement of a mobile element between a first predetermined extreme position and a second predetermined opposite extreme position, said device comprising:

a support member having an aperture therein;

a pivotable arm member having one end integrally mounted to said mobile element and an opposite end juxtaposed said support member;

means for biasing said pivotable arm member in a direction towards one of said first predetermined extreme position and said second predetermined opposite extreme position, said means for biasing having one end portion mounted to said opposite end of said pivotable arm member and an opposite end portion attached to said support member, said means for biasing further defining a pivot axis about which said pivotable arm member moves from said first predetermined extreme position to said second predetermined opposite extreme position;

thrust pin means mounted proximate said first predetermined extreme position and said second predetermined opposite extreme position to communicate with said pivotable arm member when said pivotable arm member is in one of said first predetermined extreme position and said second predetermined opposite extreme position to apply a mechanical thrust to said pivotable arm member; and electromagnetic means having one end portion mounted to said support member and an opposite end portion mounted to said pivotable arm member;

whereby as said electromagnetic means is energized said pivotable arm member is moved by said electromagnetic means from said one of said first predetermined extreme position and said second predetermined opposite extreme position to the other of said first predetermined extreme position and second predetermined opposite extreme position.

2. The device as claimed in claim 1 further comprising means for positively stopping said pivotable arm member in said first predetermined extreme position and said second predetermined opposite extreme position, said means for positively stopping being mounted to said support member.

3. The device as claimed in claim 1 wherein said opposite end portion of said electromagnetic means is a magnet mounted to said pivotable arm member at a predetermined position.

4. The device as claimed in claim 1 wherein said one end portion of said electromagnetic means comprises:
- a first member fixed to said support member and spaced a predetermined distance from one of said first predetermined extreme position and said second predetermined opposite extreme position of said pivotable arm member;
- a second member fixed to said support member and spaced a predetermined distance from the other of said first predetermined extreme position and said second predetermined opposite extreme position of said pivotable arm member;
- a first coil wire member wound around said first member;
- a second coil wire member wound around said second member; and
- means for establishing an electromagnetic attracting or repelling force in each said first member and said second member.

5. The device as claimed in claim 3 wherein said one end portion of said electromagnetic means comprises:
- a first member fixed to said support member and spaced a predetermined distance from one of said first predetermined extreme position and said second predetermined opposite extreme position of said pivotable arm member;
- a second member fixed to said support member and spaced a predetermined distance from the other of said first predetermined extreme position and said second predetermined opposite extreme position of said pivotable arm member;
- a first coil wire member wound around said first member;
- a second coil wire member wound around said second member; and
- means for establishing an electromagnetic attracting or repelling force in each said first member and said second member;
- whereby when said means for establishing said electromagnetic attracting or repelling force acts on said magnet said pivotable arm member moves from said one of said first predetermined extreme position and said second predetermined opposite extreme position to said other of said first predetermined extreme position and said second predetermined opposite extreme position.

6. The device as claimed in claim 3 further comprising means for positively stopping said pivotable arm member in said first predetermined extreme position and said second predetermined opposite extreme position, said means for positively stopping being mounted to said support member.

7. The device as claimed in claim 2 wherein said means for positively stopping said pivotable are member further comprises:
- a first stop member mounted to said support member at a predetermined position with respect to said one of said first predetermined extreme position and said second predetermined opposite extreme position, said pivotable arm member positively engaging said first stop member when said pivotable arm member moves to said one of said first predetermined extreme position and said second predetermined opposite extreme position;
- a second stop member mounted to said support member at a predetermined position with respect to said other of said first predetermined extreme position and said second predetermined opposite extreme position, said pivotable arm member positively engaging said second stop member when said pivotable arm member moves to said other of said first predetermined extreme position and said second predetermined opposite extreme position such that as said electromagnetic means is energized to produce an electromagnetic force said pivotable arm member may be moved from said one of said first predetermined extreme position and said second predetermined opposite extreme position to said other of said first predetermined extreme position and said second predetermined opposite extreme position.

8. The device as claimed in claim 7 wherein said opposite end portion of said electromagnetic means is a magnet mounted to said pivotable arm member at a predetermined position.

9. The device as claimed in claim 1 wherein said one end portion of said electromagnetic means comprises:
- a first member fixed to said support member and spaced a predetermined distance from one of said first predetermined extreme position and said second predetermined opposite extreme position of said pivotable arm member;
- a second member fixed to said support member and spaced a predetermined distance from the other of said first predetermined extreme position and said second predetermined opposite extreme position of said pivotable arm member;
- a first coil wire member wound around said first member;
- a second coil wire member wound around said second member; and
- means for establishing an electromagnetic attracting or repelling force in each said first member and said second member;
- whereby as said electromagnetic means establishes an attracting force in one of said first and second members, said electromagnetic means establishes a repelling force in the other of said first and second members such that said pivotable arm member is moved by said electromagnetic means from said first predetermined extreme position to said second predetermined opposite extreme position and whereby further as said electromagnetic means establishes a repelling force in said one of said first and second members, said electromagnetic means establishes an attracting force in said other of said first and second members to move said mobile element from said first predetermined extreme position to said second predetermined opposite extreme position.

* * * * *

UNITED STATES PATENT AND TRADEMARK OFFICE
CERTIFICATE OF CORRECTION

PATENT NO.  : 5,258,874
DATED       : November 2, 1993
INVENTOR(S) : Thierry Bajat, Jean-Jacques Digoin and Jean Nesa It is certified that error appears in the above-indentified patent and that said Letters Patent is hereby corrected as shown below:

On the Title Page, Item [54], delete "BISTABLE" and insert --BI-STABLE--.
Column 1, line 1, delete "BISTABLE" and insert --BI-STABLE--.
Column 1, line 41, delete "be" first occurance.
Column 3, line 35, insert after "4" --is--.
Column 6, line 26, delete "facilitates" and insert --facilities--.
Column 8, line 4, delete "are" and insert --arm--.

Signed and Sealed this

Thirty-first Day of May, 1994

Attest:

BRUCE LEHMAN

*Attesting Officer*  *Commissioner of Patents and Trademarks*